RADIAL ARM PHONOGRAPH WITH RECORD CHANGER

Filed Dec. 20, 1968 6 Sheets-Sheet 1

INVENTOR
ELWOOD G. NORRIS
BY
Christensen, Sanborn & Matthews
ATTORNEYS

RADIAL ARM PHONOGRAPH WITH RECORD CHANGER

Filed Dec. 20, 1968 6 Sheets-Sheet 2

INVENTOR
ELWOOD G. NORRIS
BY
Christensen, Sanborn & Matthews
ATTORNEYS

RADIAL ARM PHONOGRAPH WITH RECORD CHANGER

Filed Dec. 20, 1968 6 Sheets-Sheet 3

INVENTOR
ELWOOD G. NORRIS

BY

Christensen, Sanborn & Matthews

ATTORNEYS

RADIAL ARM PHONOGRAPH WITH RECORD CHANGER

Filed Dec. 20, 1968 6 Sheets-Sheet 4

INVENTOR
BY ELWOOD G. NORRIS
Christensen, Sanborn & Matthews
ATTORNEYS

Oct. 26, 1971 E. G. NORRIS 3,615,096

RADIAL ARM PHONOGRAPH WITH RECORD CHANGER

Filed Dec. 20, 1968 6 Sheets-Sheet 5

INVENTOR
ELWOOD G. NORRIS

BY

Christensen, Sanborn & Matthews
ATTORNEYS

INVENTOR
ELWOOD G. NORRIS
BY
Christensen, Sanborn & Matthews
ATTORNEYS 3,615,096

RADIAL ARM PHONOGRAPH WITH RECORD CHANGER

Elwood G. Norris, 2505 20th E., Seattle, Wash. 98102

Continuation-in-part of application Ser. No. 600,338, Nov. 15, 1966, now Patent No. 3,418,435. This application Dec. 20, 1968, Ser. No. 785,555
Int. Cl. G11b *17/08, 3/10*
U.S. Cl. 274—10 R 22 Claims

ABSTRACT OF THE DISCLOSURE

Disclosed is a phonograph having a pickup head supported on a tone arm which remains fixed during record play with the pickup stylus contacting the record groove and transiting a path coincident with a radius of the record as the pickup head moves along the tone arm. Automatic head position control systems are shown for sensing the approach of the stylus to the end of the record, raising the stylus from the record, and reeling the head along the tone arm to the initial playing position. A tone arm positioning system is shown for turning the tone arm out of the way to permit new records to be lowered onto the turntable and then to reposition the tone arm over the record to be played. A record stack sensing system cooperates with the tone arm rotation system to gauge the height of the record to be played and to position the tone arm at the desired height for playing such record.

CROSS-REFERENCE TO RELATED APPLICATIONS

This applicatioin is a continuation-in-part of my prior application Ser. No. 600,338, filed Nov. 15, 1966, now Pat. No. 3,418,435, entitled "Radial Phonograph Arm and Flexible Positioned Pickup Assembly ," (now U.S. Pat. No. 3,418,435, issued Dec. 24, 1968), said application having been a continuation-in-part of my application Ser. No. 389,838, filed Aug. 17, 1964.

BACKGROUND OF THE INVENTION

Field of the invention

This invention relates to phonographic apparatus and more particularly to an automatic record changer system suitable for use in a phonograph having a radial tone arm.

Description of the prior art

In the process of making a disc type phonographic record, a groove is cut into the surface of the disc extending from its outer edge and continuing spirally into the center portion of the disc. The cutting element used is mounted on an arm positioned so that the element follows a straight path on a radius of the rotating disc as the groove is cut into the disc. The angle of the cutting element with relation to the record is maintained constant throughout its radial movement inwardly. Conventional record players include a pickup head mounted on the end of a tone arm with the tone arm moving in an arc as the pickup stylus tracks in the record groove from the outer edge toward the center. This type of construtcion causes the pickup stylus to move in an arcuate path introducing distortion in the playback of the record. A further distortion is caused when a number of records are stacked on a turntable since the tone arm is usually mounted for pivoting in a vertical plane to accommodate the number of records stacked on the turntable without any attempt being made to maintain the desired angular relationship between the pickup needle and the groove consistent with the angle established between the manufacturing cutting needle and plane of the record.

To overcome some of these inaccuracies, radially extending tone arms have been developed with the pickup assembly supported by the arm in such a way that the pickup stylus follows a path coincident with a radius of the record. In some such radial tone arm record players a certain accommodation is provided for changing the elevation of the tone arm in the manner that permits it to be maintained parallel to the turntable. Such high quality record players are used in radio broadcasting studios but they have to-date, relied upon manual operation of the tone arm to swing it out of the way of the turntable during the removal of one record and placement of another record onto the turntable. Any vertical adjustment of the tone arm is generally made by means of a manual adjustment of the threaded collar support for the tone arm. Even in the case of those radial arm record players which do accommodate the height of the record, it is necessary for the operator to guess as to the height of the record stack or use some type of measuring device before he can be assured that the elevation adjustment made to the tone arm is an accurate one.

Such manual operation requirement of radial tone arms have drastically limited their market acceptance since automatic record changers have been in use for years for the more convenient swinging arc type of tone arm record players. Even though there is a significant increase in fidelity and distortionless replay with little damage to the record resulting from the use of the radial tone arm type of player, the disadvantages of having to manually position the arm over the record, raise and lower the stylus, move the arm away from the turntable, add new records to the turntable, adjust the height of the arm, and initially position the pickup head along the arm have not been accepted by a large segment of the market.

OBJECTS AND SUMMARY OF INVENTION

In view of the need for an automatic record changer suitable for use with a radial tone arm record player, it is the principal object of the instant invention to provide a reliable system for automatically changing records to be played on a record player having a radial tone arm.

It is another object of the instant invention to provide a system for gauging the height of the records positioned on a turntable and transmitting this information automatically to the tone arm so that as the arm, regardless of whether it is of the swinging arc or radial type, is positioned over the record, it will assume a predetermined playing height in relation to the height sensed by the measuring system.

A further object of the instant invention is to provide an automatic system for use with a radial tone arm record player to sense the position of the pickup element and to automatically raise the pickup stylus from the record at the end of the record without scratching or otherwise damaging the record.

A still further object of the instant invention is to provide an automatic system for use with a radial arm record player having a flexible endless drive element for moving the pickup head along the tone arm, to actuate the drive means for the flexible member to reel in the pickup head to the proper position for starting to play another record.

An additional object of the instant invention is to provide an automatic record changer assembly which can be used as a modification for currently available record changer equipment, made for use with a swinging arc type of tone arm, to utilize the currently available mechanism as the basic components for radial arm automatic record changer.

A related object of the instant invention is to provide a disconnect system for the apparatus utilized in reeling the pickup head along a radial tone arm to prevent its operation during the time that the radial arm is initially rotated toward a playing position and during the time that the stylus is tracking in the groove of the record.

In accordance with the present invention a radial tone arm is supported at its proximal end by a support housing. A vertically extending housing turn shaft is secured to the housing and is rotatable to move the radial tone arm from a playing position over the record supported on the turntable to an out-of-play position permitting record removal from and addition of records to the turntable. The radial tone arm provides support for a sound pickup head permitting it to transit along the tone arm as its stylus tracks in the groove of the record. A pulley member, positioned in the housing, drives a flexible drive member extending from the housing and through the tone arm. The pulley is mounted on a shaft which is rotated by a drive rod to move the flexible drive cord. The connection between the pulley and the rotating pulley drive rod permits the pulley to be pivoted around the primary leg of the tone arm so that there is engagement between a contacting member of the pickup head and a surface of the flexible drive member as it passes through a slotted position of the secondary tone arm leg. The establishment of this contacting relationship causes the stylus of the pickup head to be lifted from contact with the record groove as the head pivots about the primary tone arm leg. Through the rotation of the pulley the flexible drive member engaging the contacting member moves toward the housing bringing with it the pickup head.

An elbow is positioned in engagement with a portion of the pulley drive rod to cause it to move in a vertical direction relative to the housing turn shaft in which the rod is coaxially positioned. An elbow actuator is caused to flex the elbow as a result of the movement of the actuator by a conventional linkage member of the record changer. This movement is initiated as a result of the movement of a trip rod positioned in the tone arm for engagement by the pickup head as it reaches the end of the record groove.

The pulley drive rod itself includes a friction surface engageable by a movable rack support member, supported by a conventional linkage in the changer such that as the housing turn shaft is rotated to rotate the tone arm away from the play position to the out-of-play position, the movement of the rack member causes the pulley drive rod to rotate. This rotation is transmitted to the pulley for the flexible drive member. With the engagement between the pickup head and the drive member established, such rotation of the pulley and movement of the flexible drive member causes the pickup head to move from its extreme playing position to its initial playing position along the length of the tone arm adjacent to the support housing. A cam system is described in detail which prevents further rotation of the pulley drive rod during the balance of the cycled movement of the tone arm.

A collar member having a number of specially formed engagement surfaces is fixedly attached to the housing turn shaft. One such surface is engaged by a moving linkage of a conventional changer to cause the rotation of the shaft and the corresponding rotation of the tone arm from a play position to a no-play position. Another surface of the collar is engaged by another actuator to cause the counter-rotation of the shaft as a result of a reverse movement of the conventional linkage so that the tone arm is moved from the no-play position to the play position. A projection of the collar engages an inclined cam surface to cause the shaft, tone arm housing, and tone arm to become elevated to its highest position when it is moved from the play position to the no-play position. The bottom surface of the collar is positioned to engage an elevation wedge having a changeable position as dictated by a measured height of the record stack above the turntable. This engagement causes the support collar, housing turn shaft, tone arm housing, and tone arm to become supported by the wedge at the desired elevation during the time that the tone arm is in the play position.

The height of the stack of records on the turntable is gauged by means of a feeler member which is housed within the center spindle of the turntable and includes one end which provides a finger for engaging the top record on the turntable and a lower end which engages a height input cam surface connected to height linkage. The elevation wedge is positioned at the proximal end of the height linkage in order that the bottom surface of the shaft collar will engage the height wedge in accordance with the height gauged by the feeler.

These and other features and advantages of the invention will become more clearly apparent from the following detailed description thereof which is to be read with reference to the accompanying drawings.

DESCRIPTION OF THE PREFERRED EMBODIMENTS

On the basis that those skilled in this art are familiar with currently available record changer mechanisms suitable for use with the swinging arc type of tone arms, it is not considered necessary to relate in detail those components of prior known changers which have already been developed but are suitable for use in providing sequential movements for the novel components in the improved radial tone arm record changer which is the subject matter of this application. For example, the instant invention can use as its basic motion-producing elements many of the parts of the currently available Garrard Synchro-Lab Series 95 record changer. Bearing this in mind, the following description will often refer to a motion-causing linkage or element without explaining the full structure of that element on the basis that such elements and their motion characteristics are generally well known to those skilled in this art.

Figure 1:
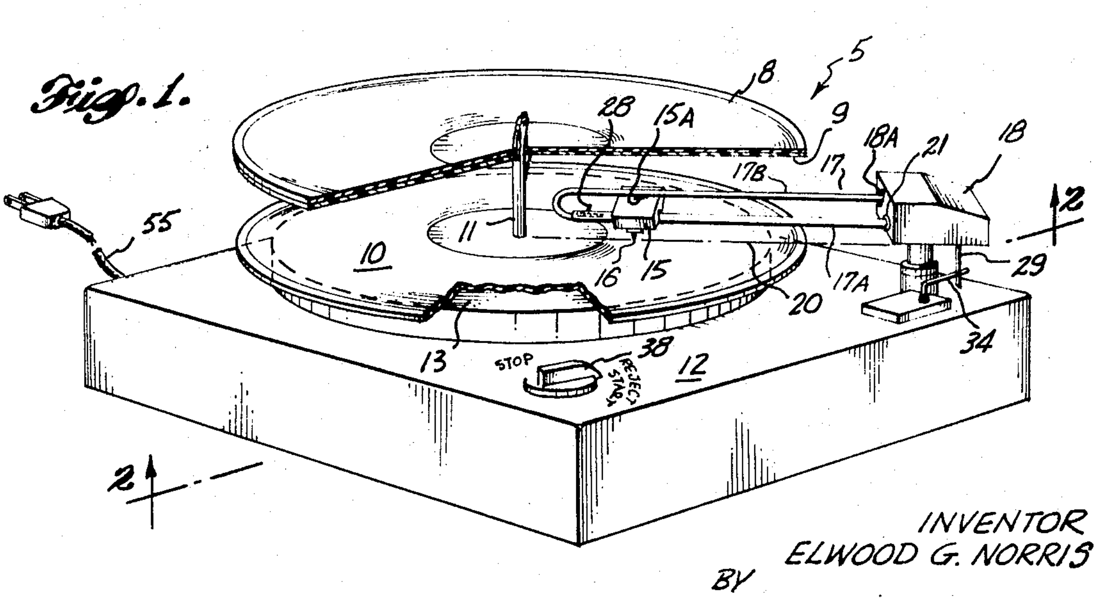
FIG. 1 is an isometric view of a radial tone arm record player having an automatic record changer system made in accordance with the instant invention.

With reference to FIG. 1, it is noted that the improved record player and changer 5 includes a center spindle 11 for supporting records 8 and 9 in a stored position and record 10 supported on turntable 13 with the housing 12 providing general support for the record changer components. A U-shaped tone arm 17 is shown positioned over disc type sound record 10 in a play position wherein the pickup head 15 transits along primary tone arm leg 17A in a radial direction from its initial position adjacent tone arm support housing 18 to its end-of-play position adjacent spindle 11. Stylus 16, which is supported by pickup head 15, tracks along the groove of the record 10 in a radial path 20 which is coincident with a radius of record 10.

In operation, to play record 10 pickup head 15 moves along tone arm leg 17A with stylus 16 positioned in the groove of record 10. As turntable 13 rotates, stylus 16 follows along radial path 20 as it tracks in the groove of record 10. An electrical signal from the stylus 16 responsive to the configuration of the record groove flows in electrical lead 25, shown in FIG. 8, to the amplification system of the record player in a conventional manner.

Figures 4, 5, 6, 7, 8, 9:
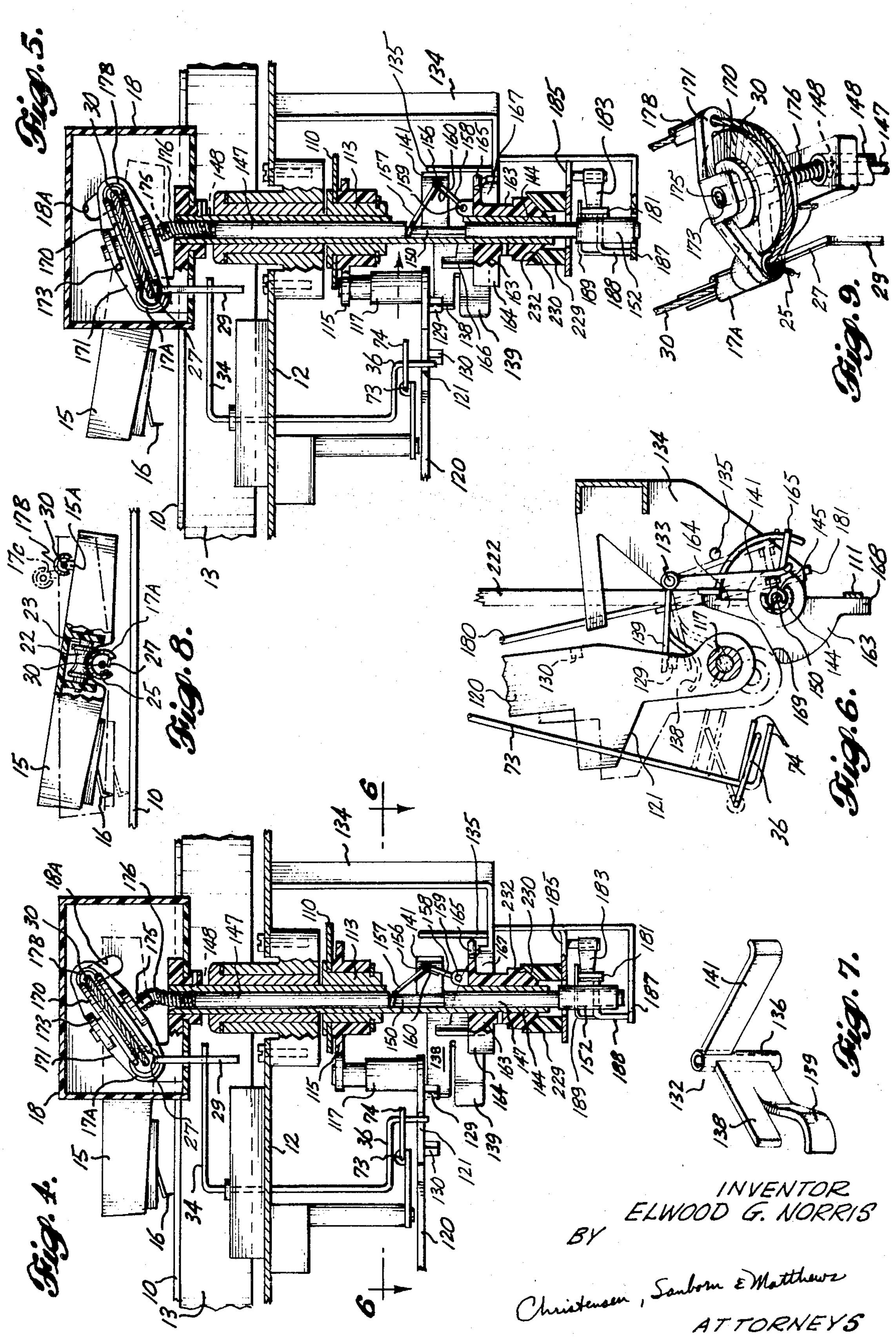
FIG. 4 is a side elevation view of the tone arm positioning assembly of the improved changer with some parts shown in section to illustrate the normal playing position thereof.
FIG. 5 is a view similar to that shown in FIG. 4 except that it illustrates the tone arm in a no-play position with the stylus picked up from the record groove.
FIG. 6 is a section view of the tone arm positioning assembly as seen from line 6—6 of FIG. 4.
FIG. 7 is an isolated isometric view of the elbow actuator utilized in the assembly shown in FIGS. 4, 5 and 6.
FIG. 8 is a side elevation view of the playing head illustrating its change from a play to a no-play position.
FIG. 9 is an isometric view illustrating the head-reeling pulley made in accordance with the instant invention.

A flat trip rod 27, as shown in FIGS. 4, 5 and 8, extends along and within the hollow portion of primary tone arm leg 17A with the trip rod's distal end 28 positioned in the path of the pickup head 15, as shown in FIG. 1. The proximal end 29 of trip rod 27 extends into an engagement path with trip feeler lever 34 which extends down into the portion of the housing 12 beneath the turntable 13. Lever 34 is rotated by the movement of proximal end 29 resulting from movement of trip rod 27 by pickup head 15 contacting distal end 28 as stylus 16 reaches the end of the recorrd groove. This rotation causes the beginning of a series of motions in the changer mechanism which will be described in more detail later.

Leg 17A of radial tone arm 17 is rotatably supported in housing 18 by bushing 21 which extends through one wall of the housing 18. The secondary tone arm leg 17B is therefore caused to rotate about the axis of the first leg 17A with the proximal end of leg 17B projecting through slot 18A formed in housing 18. A projection 15A, on the end of the pickup head 15, remote from the end from which stylus 16 projects, is engaged by the second leg 17B as it is rotated downwardly toward the record 10. This engagement pivots head 15 about leg 17A and raises stylus 16 out of contact with the groove of record 10.

In more detail, and with reference to FIGS. 8 and 9, it is seen that slot 17C extends along the lower surface of the secondary leg 17B and permits engagement between projection 15A and an endless flexible drive member 30 which is housed within and circulated through radial tone arm 17 and housing 18. As a point on drive cord 30 moves from the center of the record toward the housing 18 through leg 17B, its engagement with projection or lug 15A causes pickup head 15 to be moved along tone arm 17A in a radial direction outwardly from spindle 11 toward housing 18. For easy movement of pickup head 15 along leg 17A, tapered rollers 22 are rotatably supported by shafts 23 to provide the least amount of friction and to accommodate easy tracking of stylus 16 in the groove of record 10 as head 15 moves radially inwardly from the housing 18 toward spindle 11. This same easy movement of head 15 is provided when head 15 is moved to its solid-line position, as shown in FIG. 8, wherein lug 15A is engaged by and moves along with the flexible cord 30 so that head 15 transits along leg 17A in an outward radial direction from spindle 11 toward housing 18.

In my previously-mentioned earlier application, the operations of picking stylus 16 up from the record and moving it along the tone arm 17 toward housing 18 and turning tone arm 17 from a playing position over the record to an out-of-play position off to the side of the turntable, were all performed by manual manipulations of the components. It is the purpose of the instant application to disclose a series of automatic systems for performing these functions and, in addition, to add records to the turntable on an automatic basis.

Figure 2:
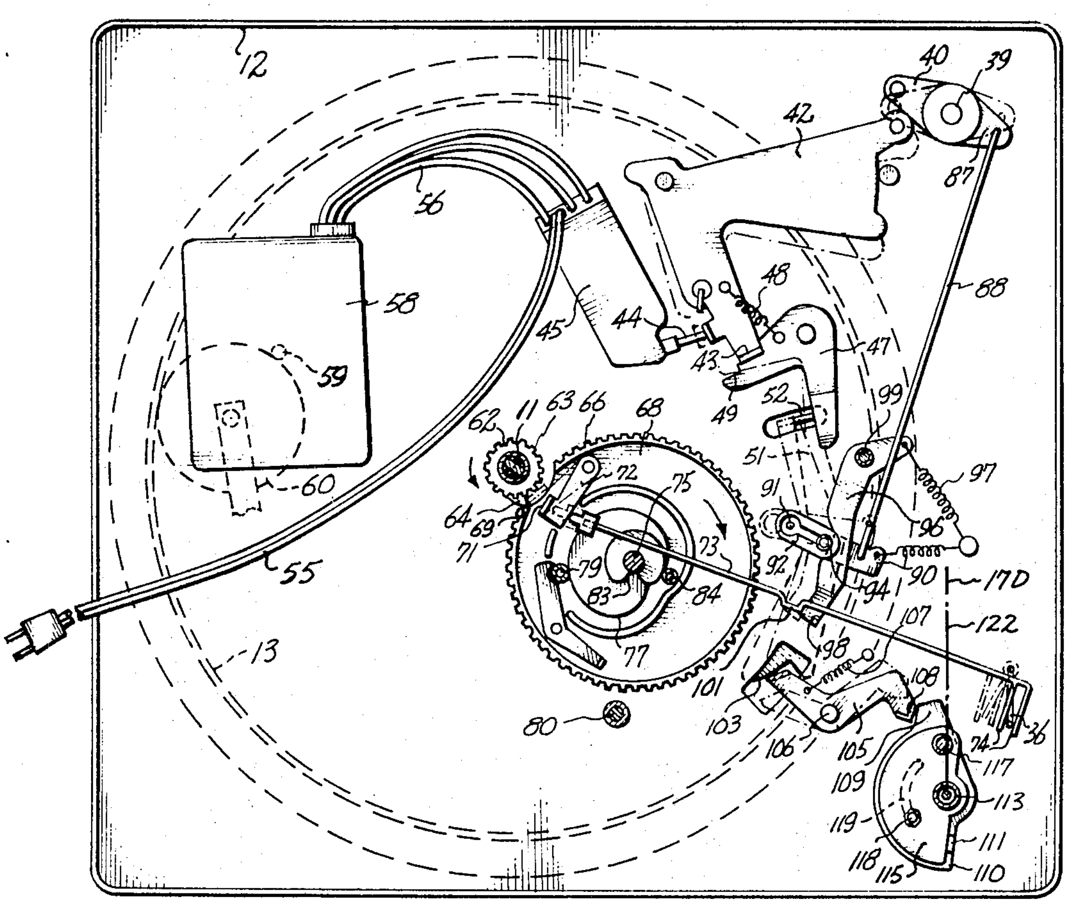
FIG. 2 is a bottom plan view of the improved record changer as seen from line 2—2 of FIG. 1 with some parts shown in section for clarity.

With reference to FIG. 2, it is noted that the viewer sees the underside of housing 12. A good deal of the mechanism not necessary to the performance of the functions of this invention is not shown. The major portion of the components of the mechanism for performing the functions of this invention is not visible in this view, since they are positioned just below the components shown in this view and are therefore shown in greater detail in FIG. 3. Basically, the side walls of the housing 12 enclose the major components of the turntable and tone arm operating systems. As shown in FIG. 1, the start-stop switch 38, positioned on the upper side of housing 12, is supported by shaft 39 which extends down beneath the turntable 13 and is secured to start-stop cam 40, shown in FIG. 2.

In the solid-line position of FIG. 2, start-stop cam 40 rests against the cam surface of motor switch actuator arm 42. When shaft 39 is turned to the start position as shown in dotted lines, cam 40 rotates actuator arm 42 until it dpresses motor switch plunger 44 of motor switch 45. The plunger-locking cam 47 is spring-biased by spring 48 to actuator arm 42 is rotated to depress switch plunger 44, plunger-locking cam 47 rotates toward actuator arm 42 until the notch 49 of locking cam 47 engages the extreme end 43 of actuator arm 42 holding the plunger 44 in its depressed position. This rotation of locking cam 47 also causes engagement and movement of hidden link 51, which is positioned between the turntable 13 and the lower portion of the housing 12 as an actuation extension 52 of link 51, projected into the path of one portion of locking cam 47, is moved thereby.

The depression of plunger 44 makes the electrical connection, not shown, in motor switch 45 between the electrical current source as represented by power cord 55 and motor control cables 56 causing actuation of motor 58 and the rotation of its power pinion 59. A soft rubber power disc 60 transmits the torque from pinion 59 to the surface of turntable 13 to cause its rotation.

With continued reference to FIG. 2, it is noted that a center drive pinion 62 is supported by and rotates with turntable 13 about the axis of spindle 11. Drive pinion 62 includes normal teeth 63 and a pickup lug 64 projecting radially from the side surface thereof. Normal teeth 63 are sized to correspond with the teeth 66 formed on the outer periphery of disc cam wheel 68. Teeth 66 extend completely around the periphery of cam wheel 68 except for the dished-out cycle cutout portion 69 which is formed in the periphery of cam wheel 68 so that at the end of one complete rotation of wheel 68 its rotation is stopped due to the lack of engagement between teeth 63 of drive pinion 62 and teeth 66 of cam wheel 68.

When a new cycle is to be initiated, a projecting detent 71 mounted at one end of detent lever 72 is pushed into an engaging position for contacting pickup lug 64 of pinion 62 to rotate cam wheel 68 into position for normal engagement between teeth 63 of pinion 62 and teeth 66 of cam wheel 68. Detent lever 72 is cycled by means of movement of cycle start rod 73. Cam wheel 68 is rotated about cam axle 75 in the direction shown by the arrow. Defined within cam wheel 68 are two cam surfaces; a primary cam surface 77 which dictates the position of the primary lever 78, shown in FIG. 3, as primary cam follower 79 causes lever 78 to rotate about primary pivot shaft 80. The secondary cam surface 83 contacts secondary follower 84 which is connected to the secondary linkage plate 85, shown in FIG. 3.

Connected to the other end of start-stop switch cam 40 and rotatable about shaft 39 is control lever 87 which is connected to one end of control rod 88. The other end of control rod 88 is secured to slotted crank 90 which pivots about pivot shaft 91 connected to slotted crank 90 through slot 92. A fulcrum pin 94 projecting from crank 90, contacts one edge of control bell crank 96 which is biased by spring 97 to rotate its working end 98 about its pivot point 99. An abutment in the form of a loop 101 on cycle start rod 73 is engaged by working end 98 such that movement of slotted crank 90 in either direction by means of control rod 88, causes clockwise movement of bell crank 96 forcing its working end 98 to move radially inwardly to cause an inward force against loop 101 resulting in an inward movement of cycle start rod 73. Movement of slotted crank 90 in a counterclockwise direction, through projections not shown, urges hidden link 51 to rotate in a counterclockwise direction such that a cam surface 103 at one end of hidden link 51 is pushed against catch bell crank 105 forcing it to rotate in a counterclockwise direction about its pivot 106 against the biasing force of its biasing spring 107. As shown in solid lines in FIG. 2, the stop element projection surface 108 of catch bell crank 105 is moved from an obstructing position preventing counterclockwise movement of the wing portion 109 of upper clutch plate 110, to a dotted-line position where wing member 109 is free to rotate with upper clutch plate 110 about its supporting shaft 113. If, on the other hand, slotted crank 90 is moved in a clockwise direction about its pivot 91, as when switch 38 is moved to the "stop" position, the cam surface 103 of hidden link 51 is rotated in a clockwise direction causing clutch bell crank 105 to assume its solid-line position under the influence of biasing spring 107 to obstruct the movement of wing portion 109 as it engages stop element 108.

Cycle start rod 73 can also be caused to move radially inwardly due to the rotation of crank arm 36 as it moves in a clockwise direction, as seen in FIG. 2, due to the rotation of trip feeler lever 34, as seen in FIG. 1, as head 15 pulls trip rod 27 radially inwardly. The rotation of crank arm 36 against the end legs 74 of cycle start rod 73 is translated into the movement of start rod 73. Start rod 73 assumes its solid-line position again as projection 121 of main linkage plate 120, shown in FIG. 3, moves radially outwardly in the path of the lower end of crank 36.

With the exception of the last-mentioned end legs 74 attached to cycle start rod 73 and crank arm 36, as part of trip feeler lever 34, the foregoing description relates to mechanisms and structure of FIG. 2, currently known to those skilled in the art and currently provided in the commercially available record changer sold under the name Gerrard Synchro-Lab 95. The purpose of the foregoing description has been to recite the elements involved in this mechanism so that reference throughout the specification to such elements will provide those skilled in the art with a complete understanding of the mechanical systems involved in the operation of the instant invention. It is therefore stated that other similar systems providing the same basic sequence of movements and other operating characteristics could be equally well used or developed by those skilled in the art to provide the necessary inputs for operation with applicant's mechanisms, as hereinafter will be more completely described.

Figures 3, 15:
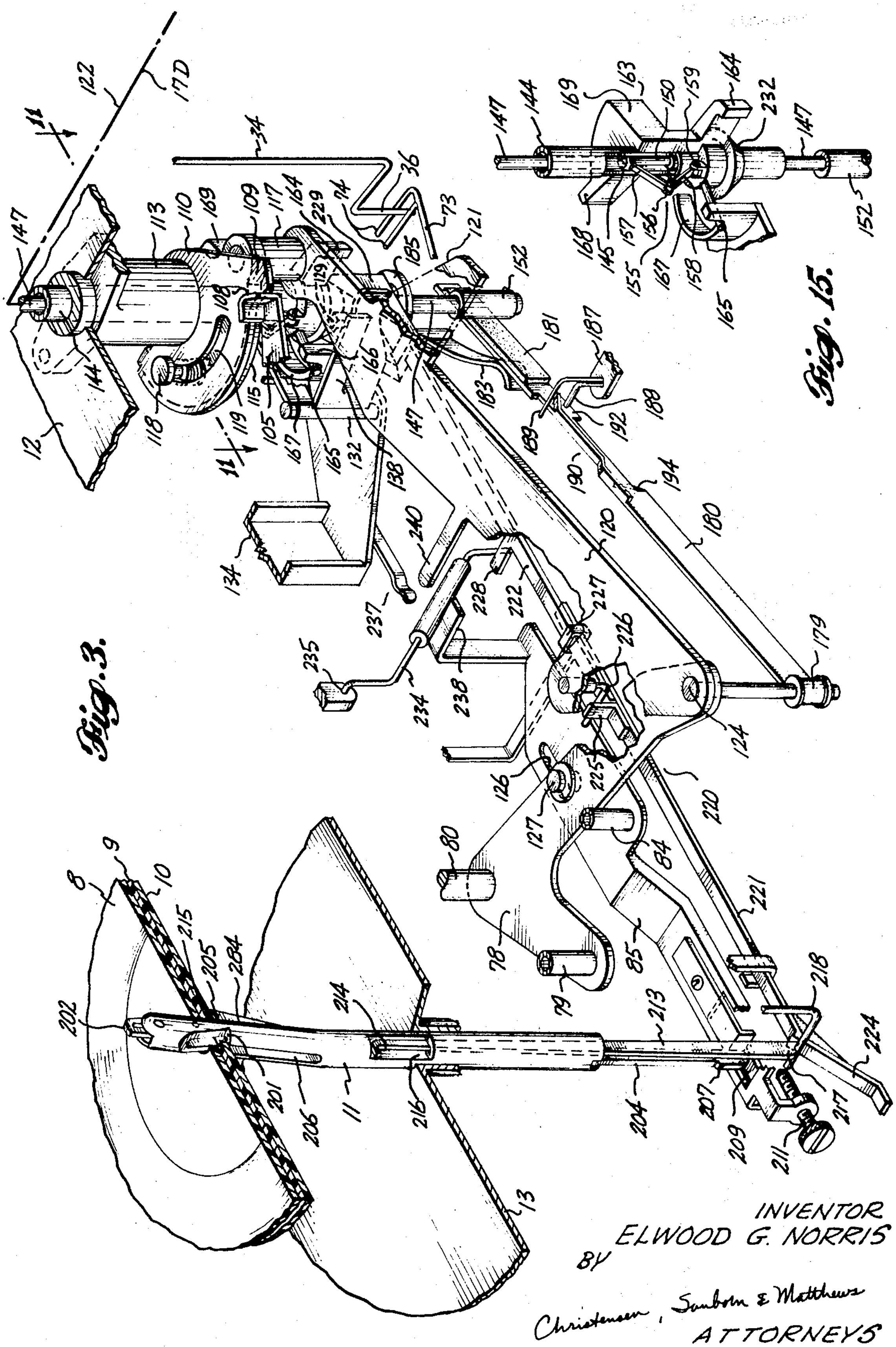
FIG. 3 is an isometric view of the center spindle and the major components of the record changer positioned below those shown in FIG. 2.
FIG. 15 is an isolated isometric view of the turn shaft and support collar made in accordance with the instant invention.

With continued reference to FIG. 2, it should also be noted that lower clutch plate 115 also freely rotates about supporting shaft 113 in a manner similar to that of upper clutch plate 110. A drive pin connection 117 with the primary linkage plate 120, as shown in FIG. 3, is provided to rotate lower clutch plate 115 about supporting shaft 113. Spring-biased connector pin 118 extends from an aperture formed in lower clutch plate 115, into the slot 119 provided in upper clutch plate 110. With connector pin 118 and slot 119 it is possible for lower clutch plate 115 to rotate about shaft 113 without rotation of upper clutch plate 110, such as in the situation where wing portion 109 of upper clutch plate 110 is prevented from rotation due to its engagement with stop element 108 of catch bell crank 105. The extent of this free relative movement is limited by the length of the slot 119. In the dotted-line position, where catch bell crank 105 has been rotated in a countercockwise direction freeing its engagement with wing portion 109 of upper clutch plate 110, any rotation of lower clutch plate 115 also causes the same rotation of upper clutch plate 110 through the surface friction between these plate members as provided by the biasing spring in connector pin 118. It should also be noted that clutch plates 110 and 115 rotate about shaft 113 but do not cause shaft 113 to rotate since it is a fixed member secured to housing 12.

With more specific reference to FIG. 3, it is noted that this drawing isometrically illustrates the major working components of applicant's invention as they are positioned in the no-play condition with the tone arm axis 17D aligned parallel to no-play axis 122. In the condition shown, primary bell crank 78 is in its most inward radial position with its main pivot pin 124 connected to primary linkage plate 120 in its closest position to center spindle 11. This results in the position of drive pin connection 117 between primary linkage plate 120 and lower clutch plate 115 in its most inward radial position. Secondary linkage plate 85, however, is not in its most inward radial position since the slot 126 defined therein for connection with primary bell crank 78 through connector pin 127 permits more inward radial movement of secondary linkage plate 85 relative to the most inward radial position of bell crank 78.

There are five basic systems in applicant's improved record player and changer 5, which perform the following often interrelated five functions: (1) to sense the end of the record and to initiate the beginning of a cycle for changing the position of tone arm 17 permitting the addition of a new record to turntable 13; (2) to raise and lower stylus 16 away from and into contact with the groove of the record; (3) to reel pickup head 15 along tone arm 17A from an end-of-play position to an initial play position adjacent housing 18; (4) to turn tone arm 17 between the play position over the record where stylus 16 transits therealong on axis 20 to a no-play position where the axis 17D of tone arm 17 is positioned parallel to no-play axis 122 and back again; and, (5) to sense the height of the record to be played and to position tone arm 17 at a predetermined elevation over the turntable depending upon the height sensed.

While FIG. 3 shows some components of each of these systems, it is necessary in addition to proceed to other figures to describe each of the systems in more detail.

END-OF-RECORD, REPEAT CYCLE SYSTEM

With reference to FIGS. 1 to 3, 8 and 9, it is seen that trip rod 27 extends along and within primary tone arm leg 17A with its distal end 28 positioned for engagement and movement toward the center of the record as it is contacted by pickup head 15 near the end of the record groove. As distal end 28 is moved toward the center of the record, so too is proximal end 29 which engages trip feeler lever 34 causing the rotation of crank arm 36 which extends through the housing 12. Rotation of crank arm 36 through engagement with one of end legs 74 pushes cycle start rod 73 radially inwardly until detent lever 72 positions the projecting detent 71 into the path of pickup lug 64 on center drive pinion 62. The continued rotation of center drive pinion 62 initiates the engagement of normal teeth 63 of drive pinion 62 with teeth 66 of disc cam wheel 68 starting the cycle of movement of primary bell crank 78, primary linkage plate 120 and secondary linkage plate 85. The engagement of crank arm 36 by the outward movement of projection 121 on primary linkage plate 120 returns trip rod 27 to its initial position relative to primary tone arm leg 17A.

STYLUS PICKUP SYSTEM

Although many of the components operate at the same time, for ease of understanding the various systems herein, an initial description of the stylus movement system will be related without including in the description all of the other components which move with it. With reference to FIGS. 3 through 9, it is noted that primary linkage plate 120 includes detent 129 projecting from beneath the outer end thereof adjacent to drive pin connection 117. Positioned in the path of detent 129 is pivoting elbow actuator 132, as shown in FIG. 7 isolated from the rest of the mechanism, and as shown in FIGS. 3 through 6 in combination with other components of the system.

Elbow actuator 132, includes a vertically extending actuator sleeve 136 from which extend upper and lower arms 138 and 139 and actuator wing 141. Projecting downwardly from housing 12, support frame member 134 is positioned adjacent to the path of the outer end of primary linkage plate 120 and includes a vertically extending pivot pin 133 for pivotally supporting elbow actuator 132 as the pin 133 is inserted into actuator sleeve 136.

Tone arm housing 18 is supported for rotational and vertical movement by turn shaft 144 which projects downwardly from the lower end of housing 18 through housing 12 and through supporting shaft 113 to its lower end which is surrounded by and fixed to shaft collar 163. As best shown in FIG. 15, turn shaft 144 is hollow and an intermediate portion of its length defines an elongated vertically extending slot 145. Longitudinally slidable within the hollow portion of turn shaft 144 is head control rod 147 having an upper end 148, a lower end forming drive rod pinion 152, and a reduced neck portion 150 positioned intermediate pinion 152 and upper end 148 in registry with elongated slot 145 of turn shaft 144.

Projecting through elongated slot 145 is elbow member 155. The upper leg 157 of elbow 155 includes a forked end embracing the upper end of reduced neck portion 150 to vertically support head control rod 147. Lower leg 158 of elbow 155 is connected at hinged joint 156 to upper leg 157 and at its lower end to pivot point 159 secured to shaft collar 163. Elbow 155 may be biased to its collapsed position by means of spring 160, as shown in FIG. 4. Operating against the bias of spring 160 is actuator wing 141 of elbow actuator 132 which makes contact with a hinge joint 156 of elbow 155 as a result of detent 129 engaging upper wing 138 of elbow actuator 132 is a position as shown in FIGS. 4 and 6. The outward movement of actuator wing 141 is resisted by backstop pin 135 supported on frame member 134, permitting elbow 155 to flex to the lower position shown in FIG. 5 and in dashed lines in FIG. 6.

In sequence, as primary linkage plate 120 moves outwardly from the solid-line to the dashed-line position shown in FIG. 6, elbow actuator 132 rotates in a counterclockwise direction permitting elbow 155 to move from the position shown in FIG. 4 to a flexed position shown in FIG. 5 thereby lowering head control 147 in relationship to the vertical position of turn shaft 144.

As shown in FIG. 9, flexible endless frictional drive cord 30 is looped around control pulley 170. A pulley yoke support 171 has one end secured to the proximate end of primary tone arm leg 17A and the other end secured to secondary tone arm leg 17B. An axle support bushing 173 is positioned on either face of pulley 170 to hold pulley axle 175 permitting rotation of control pulley 170 and drive cord 30 around pulley shaft 175. The lower end of pulley shaft 175 is connected by means of a flexible connector in the form of coil spring 176 to upper end 148 of head control rod 147.

With this structure the straightening out and upward extension of elbow 155 through the inward movement of linkage 120 whereby inward movement of detent 129 results in clockwise rotation of actuator 132 which causes control rod 147 to move upwardly and pulley 170 to pivot about leg 17A to lower stylus 16 into the groove of record 10. This is shown in the dashed-line position of FIG. 8 and the solid-line position of FIG. 4. When elbow 155 is permitted to flex to the position shown in FIG. 5 and in the dashed-line position shown in FIG. 6, head control rod 147 is lowered in vertical relationship to block turn shaft 144 causing pulley yoke 171 to rotate downwardly about leg 17A until leg 17B engages projection 15A on the top of head 15 causing it to rotate about leg 17A, raising stylus 16 from the groove to the solid-line position shown in FIG. 8. In this position there is direct engagement between projection 15A and the flexible drive cord 30. It is therefore seen that coaxial relationship between head control rod 147 and block turn shaft 144 and the flexible connection through spring 176 to pulley shaft 175 permits the remote and automatic rotation of tone arm leg 17B with relation to tone arm leg 17A for purposes of vertically positioning stylus 16 with relation to the record 10.

HEAD-REELING SYSTEM

After a record has been played or the operator rejects the continued playing of the present record by turning switch 38 to "start," it is necessary for stylus 16 to be picked up from the record and for pickup head 15 to be moved along tone arm 17 toward housing 18 back to its initial playing position. As shown in the solid-line rendering of FIG. 8, when the pickup head 15 has been rotated, lifting stylus 16 up from record 10, contact is made between the lug 15A and endless friction drive cord 30 as lug 15A extends through slot 17C of secondary leg 17B. To cause movement of head 15 along tone arm 17 toward housing 18, it is necessary for control pulley 170 to be rotated on its shaft 175 to move drive cord 30 along the legs 17A and 17B of tone arm 17. With shaft 175 keyed to pulley 170 the rotation of head control rod 147 causes the rotation of the flexible connector or spring 176 which in turn causes the rotation of pulley 170.

To provide the rotation for control rod 147, as is necessary for rotating drive cord 30 and thereby reeling in playing head 15 along tone arm 17, many different systems can be used including a constantly rotating gear pulley drive. Since the pickup head 15 can only be moved when lug 15A engages drive cord 30 and this condition only exists during the time that elbow 155 is permitted to flex, it would be possible to rotate control rod 147 continuously without fear of scratching the record since stylus 16 is not in contact with the record during the time that lug 15A is in contact with the endless friction drive cord 30. Upon engagement of head 15 with the housing 18, the lug 15A would merely slip on cord 30.

However, it is more desirable to rotate pulley 170 and thus move drive cord 30 only during that portion of the cycle when pickup head 15 is desired to be moved along tone rm 17 toward housing 18. To perform this cyclic operation, the existence of the motion system currently available in record changers reduces the need for developing a whole new motion system. As shown in FIG. 3, main pin 124, connecting primary linkage plate 120 to primary bell crank 78, extends downwardly beyond this point of connection to provide a pivotal connection with rack support arm 180 at its inner end 179. Rack support arm 180 extends radially outward with its rack end 181 positionable into contact with drive rod pinion 152.

The connection between the rack end 181 and drive rod pinion 152 can be a gear tooth rack and pinion type connection or it can be provided by having any other high frictional surface contact between these two members. With such contact the movement of rack support 180 in a radial direction as a result of the cam operated movement of primary bell crank 78 causes the rotation of head control rod 147. To insure a good frictonal contact between rack end 181 and drive rod pinion 152, a biasing means in the form of spring 183 extends from pin 184 which is secured to a support plate extension 185 from support frame member 134.

As shown in FIGS. 4 and 5, a cam follower support 187 is also connected to the frame through support frame member 134 to position cam follower rod 188 in engaging position with the cam portion 190 of rack support 180. Cam follower rod 188 guides the upper edge of cam portion 190 by means of feeler member 189. In the condition shown in FIG. 3 and in the top portion of FIG. 10, rack support 180 is in its innermost position with cam follower rod 188 abutting against cam area 192 to flex rack spring 183 disengaging any connection between rack end 181 and drive rod pinion 152. This position is seen also in FIG. 4 where there is a clear gap between the surface of rack end 181 and the surface of drive rod pinion 152.

Figure 10:
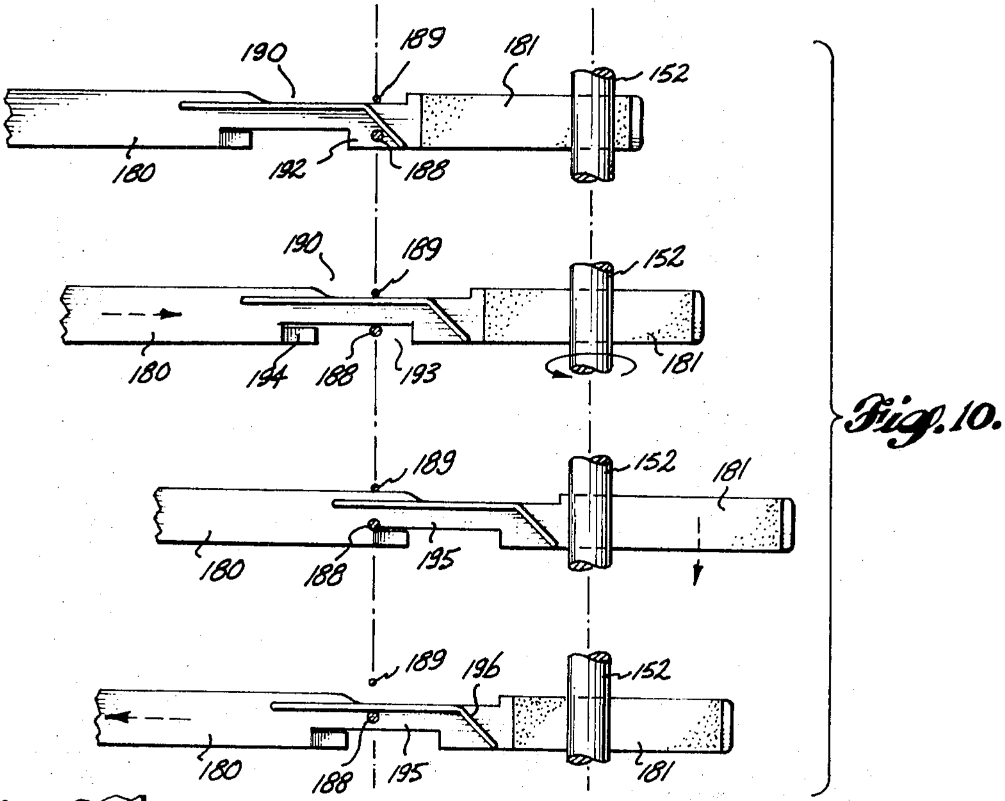
FIG. 10 is a series of side elevation views illustrating the sequence of positions of the head-reeling actuator made in accordance with the instant invention.

With reference to the upper middle portion of FIG. 10, it is seen that the movement of rack support 180 in an outward direction, as indicated by the arrow, due to the cam movement of primary bell crank 78, changes the position of cam portion 190 such that cam follower rod 188 is in a cutout portion 193 of cam portion 190 permitting the spring 183 to urge frictional contact between rack end 181 and drive rod pinion 152 causing the rotation of pinion 152. This rotation of course is transmitted through head control rod 147 to control pulley 170 resulting in the movement of drive cord 30 along tone arm 17. Because of the engagement between cord 30 and lug 15A during this portion of the cycle, this movement of cord 30 causes pickup head 15 to transit along tone arm 17 toward housing 18.

The lower middle part of FIG. 10 illustrates the position of rack support 180 in its extreme outward radial position. Just prior to this position cam follower rod 188 is engaged by the plow portion 194 of cam 190 to urge spring 183 to flex causing the disengagement between rack end 181 and drive rod pinion 152, thereby stopping the rotation of head control rod 147. With a loose connection for rack support 180 at its inner end 179, a limited amount of vertical movement is permitted for rack support 180 as shown by the downward arrow such that the end of cam follower rod 188 is now positioned for its return path along cam portion 195 as shown in the bottom illustration of FIG. 10. In this position spring 183 is maintained flexed causing the continued disengagement between rack end 181 and rod drive pinion 152. Thus, control pulley 170 is not rotated and pickup head 15 is not moved along tone arm 17 until the control of flexible member 30 except during that portion of the cycle wherein cam follower rod 188 is in cutout portion 193 of the cam 190. At the end of the movement initially illustrated in the bottom illustration of FIG. 10, a second plow 196 urges rack support 180 upwardly so that the initial position shown in the top illustration of FIG. 10 is assumed by cam follower 188 pushing against cam surface 192.

TONE ARM TURNING SYSTEM

With reference to FIGS. 3 and 11 to 15, it is seen that there has been provided a system for automatically turning tone arm 17 as a result of the motion of primary linkage plate 120 radially outwardly and inwardly in accordance with the motion dictated by the operation of disc cam 68. In the condition shown in FIGS. 3 and 11, tone arm axis 17D is coincident with no-play axis 122 so that records can be loaded onto and removed from turntable 13 without interference from tone arm 17. Catch bell crank 105 is positioned with its stop element 108 in the path of wing portion 109 of upper clutch plate 110. This is the normal position for these components when player 5 has completed playing the last of the stacked records or switch 38 has been turned to the "stop" position. Cycle start rod 73 is in its outermost radial position so that the continued rotation of pinion 62 will not cause any rotation of disc cam wheel 68. Connector pin 118 between upper clutch plate 110 and lower clutch plate 115 is in the extreme clockwise position at the end of slot 119. Collar turn actuator leg 111 extends downwardly from one edge of upper clutch plate 110 so that it can contact and engage shaft collar turn-in arm 168.

Figure 12:
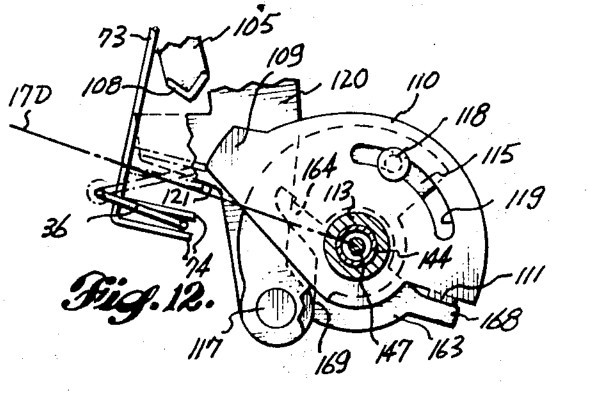

As shown in dashed lines in FIG. 12, cycle start rod 73 has been moved inwardly through the rotation of start-stop switch 38 so that detent lever 72 disposes projecting detent 71 in the path of pickup lug 64 on center drive pinion 62. Continued rotation of center drive pinion 62 causes the engagement of normal pinion teeth 63 with teeth 66 of disc cam wheel 68. Primary cam follower 79 begins its movement along primary cam surface 77 causing the rotation of primary bell crank 78 and the outward radial movement of primary linkage plate 120. Linkage side arm 121, extending transversely from primary linkage plate 120, abuts against the lower end of crank arm 36 to pull cycle start rod 73 radially outwardly withdrawing projecting detent 71 from the path of pickup lug 64 and center drive pinion 62. If cycle start rod 73 is not moved radially inwardly by the rotation of start-stop switch 38 or the movement of trip rod 27, the cycle will be completed when the cycle cutout portion 69 of disc cam wheel 68 is rotated in registry with center drive pinion 62, where the lack of gear teeth in this portion of disc cam wheel 68 prevent its further rotation.

Figure 13:
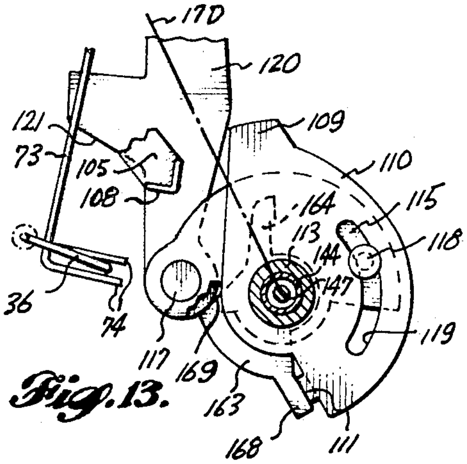

In FIG. 12 primary linkage plate 120 has moved radially outward as a result of approximately 90° of rotation of disc cam wheel 68. In the position shown in FIG. 12 lower clutch plate 115 is in its maximum counterclockwise position with connector pin 118 spring biasing upper clutch plate 110 to upper clutch plate 115. Continued rotation of disc cam wheel 68 beyond 180° from its initial starting point causes the reversal of movement of primary linkage plate 120 starting it to move inwardly and with it lower clutch plate 115 begins a clockwise movement which is also followed by clockwise movement of upper clutch plate 110. The movement of collar turn actuator leg 111, extending from upper clutch plate 110 in contact with collar turn-in arm 168, urges collar 163 and turn shaft 144 to rotate in a clockwise direction to move tone arm 17 to its play position extending over turntable 13. This position is shown in FIG. 13.

Figure 11:
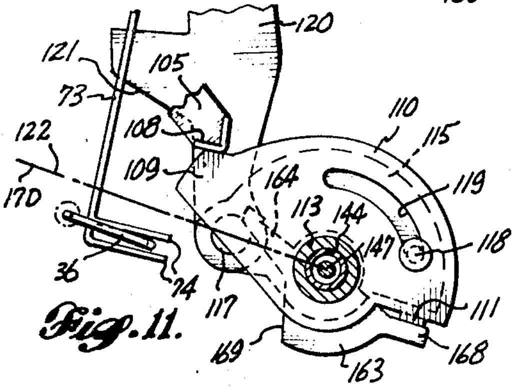
FIGS. 11 to 14 are section views through line 11—11 of FIG. 3 illustrating the sequence of operation for the tone arm turning assembly made in accordance with the instant invention.
Figure 14:
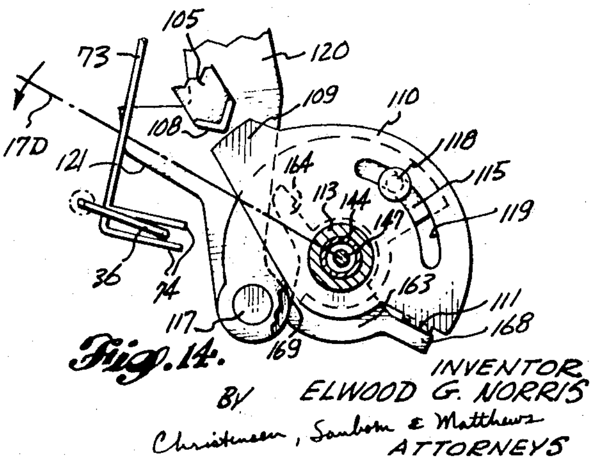

The record is then played in the normal manner with stylus 16 tracking in the record groove until start-stop switch 38 is moved or the trip rod 27 is actuated to move cycle start rod 73 inwardly engaging projecting detent 71 into contact with pickup lug 64 to initiate another cycle of rotation for disc cam wheel 68. The initiation of rotation of disc cam wheel 68 begins the outward movement of main linkage plate 120 and the counterclockwise movement of lower disc clutch 115. Since drive pin connection 117 continues its engagement with collar turn-out surface 169, the outward movement of primary linkage plate 120 causes the counterclockwise rotation of shaft collar 163. As shaft collar 163 is rotated, so too is turn shaft 144 which results in the rotation of tone arm 17 in an outward direction as shown in FIG. 14. Since upper clutch plate 110 is frictionally bound through the biasing force of connector 118 to lower clutch plate 115, it is also rotated in a counterclockwise direction until it reaches the position as shown in FIG. 11. At this time if no additional records are remaining in the stack, catch bell crank 105 will be projected into the position as shown in FIG. 11 whereby stop element 108 blocks the clockwise rotation of upper clutch plate 110 by engaging wing portion 109 thereof and linkage plate 120 returns to its FIG. 3 initial position. If additional records are sensed, catch bell crank 105 will remain in its out-of-the-way position as shown in FIG. 12 to permit the clockwise rotation of upper clutch plate 110 when primary linkage plate 120 begins its inward movement as a result of the movement of disc cam wheel 68 beyond its 180° point.

HEIGHT-GAUGING SYSTEM

With reference to FIGS. 3 and 16 to 18, a system is described for performing the function of sensing the height of the record to be played and positioning the tone arm a predetermined height above the record. As shown in FIG. 3, records to be played, 8, 9 and 10, are initially supported on spindle 11. The exact construction of spindle 11 may vary as long as sufficient structure is provided for individually dropping one record at a time onto turntable 13 or records supported on it from the storage position on the top of the spindle 11. As shown, a top guide element 202 assists in forcing the stored records 8 to 10 to be supported on support ledge 201 of the upper end of spindle 11. A tongue member 204 extends throughout the length of spindle 11 projecting downwardly beyond the length of spindle 11 and includes an upper support edge 205 which applies additional support to the lowermost record 10 on the stack. Tongue 204 is permitted certain rotation within and through the side slots 206 formed in spindle 11. The lower end 207 of tongue member 204 is supported within a tongue socket 209 which forms a part of secondary linkage plate 85, as shown in FIG. 3. As secondary linkage plate 85 moves radially inwardly or outwardly due to the movement of the primary bell crank 78 or secondary cam follower 84, tongue member 204 is caused to rotate within spindle 11 to project through side slots 206 or to be withheld within the body of spindle 11. To the extent that spindle 11 has been described to this point, its structure and operation are conventional.

To gauge the height of the record supported on turntable 13, height rod 213 has been added to make a part of spindle 11 as shown in FIGS. 3 and 16 to 18. The upper end of height rod 213 includes a transversely projecting record contact finger 214 which engages the edge of the center record hole 215 to sense the height of that record. The lower end 217 of height rod 213 is initially supported upon perch support member 218 so that record contact finger 214 is bodily held within recess 216 formed in the body of spindle 11 just above the upper surface of turntable 13. In this position, as shown in FIG. 3, the record 10 can pass along the length of spindle 11 and along the recess 216 without being engaged by record contact finger 214. An adjustable pushrod 211 is supported on an extension of secondary linkage plates 85 to urge lower end 217 of height rod 213 off of perch 218 when secondary linkage plate 85 is moved radially outward from spindle 11.

Figure 16:
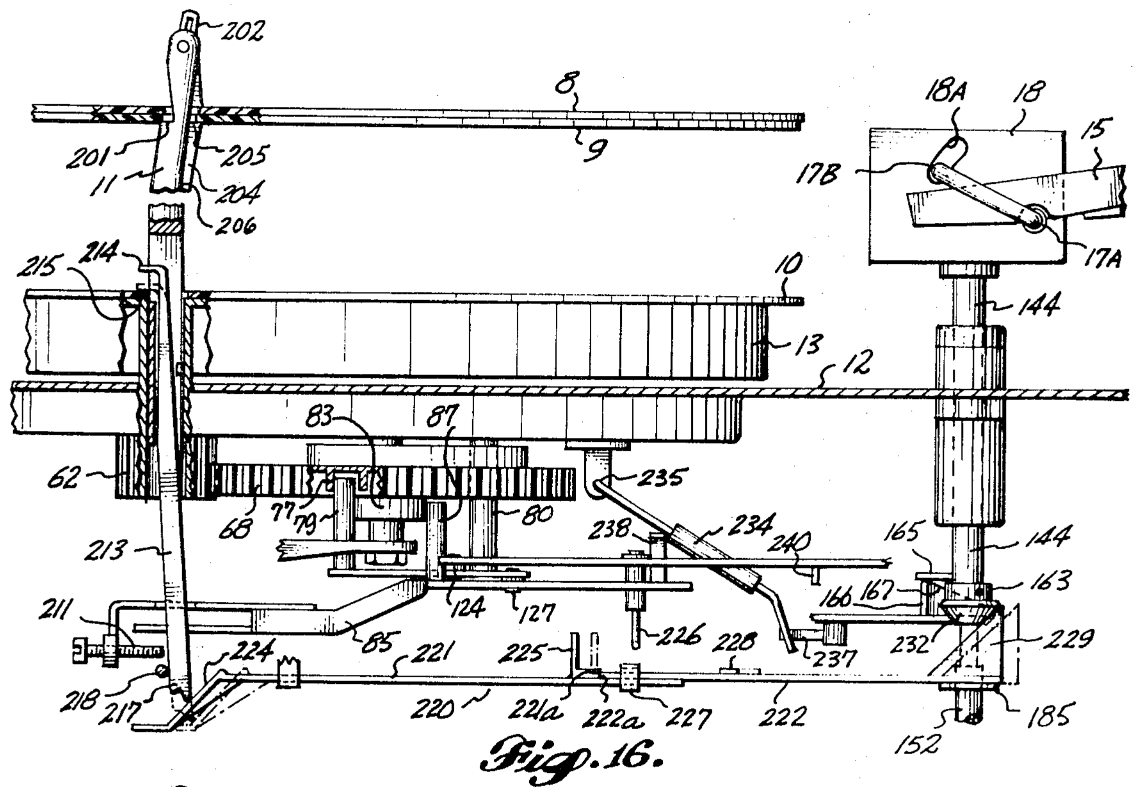
FIGS. 16 to 18 are side elevation views illustrating the sequence of operation of the tone arm elevation assembly made in accordance with the instant invention.
Figure 17:
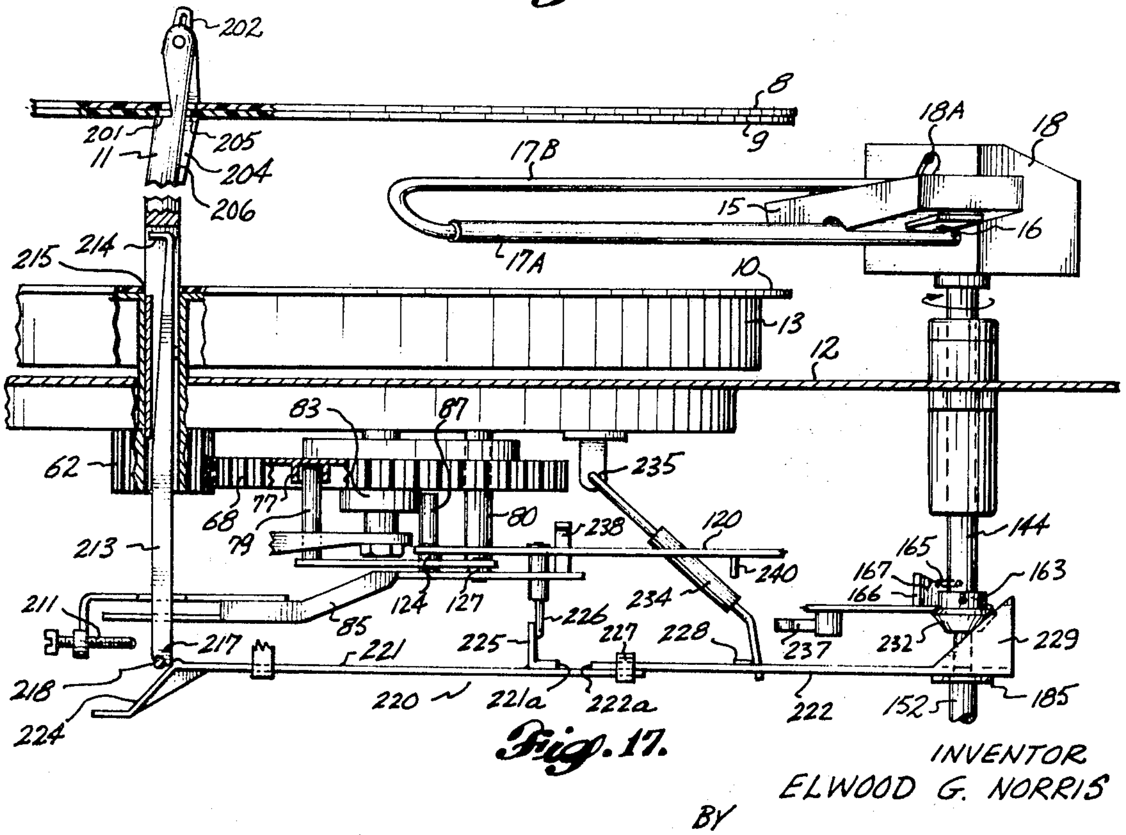
Figure 18:
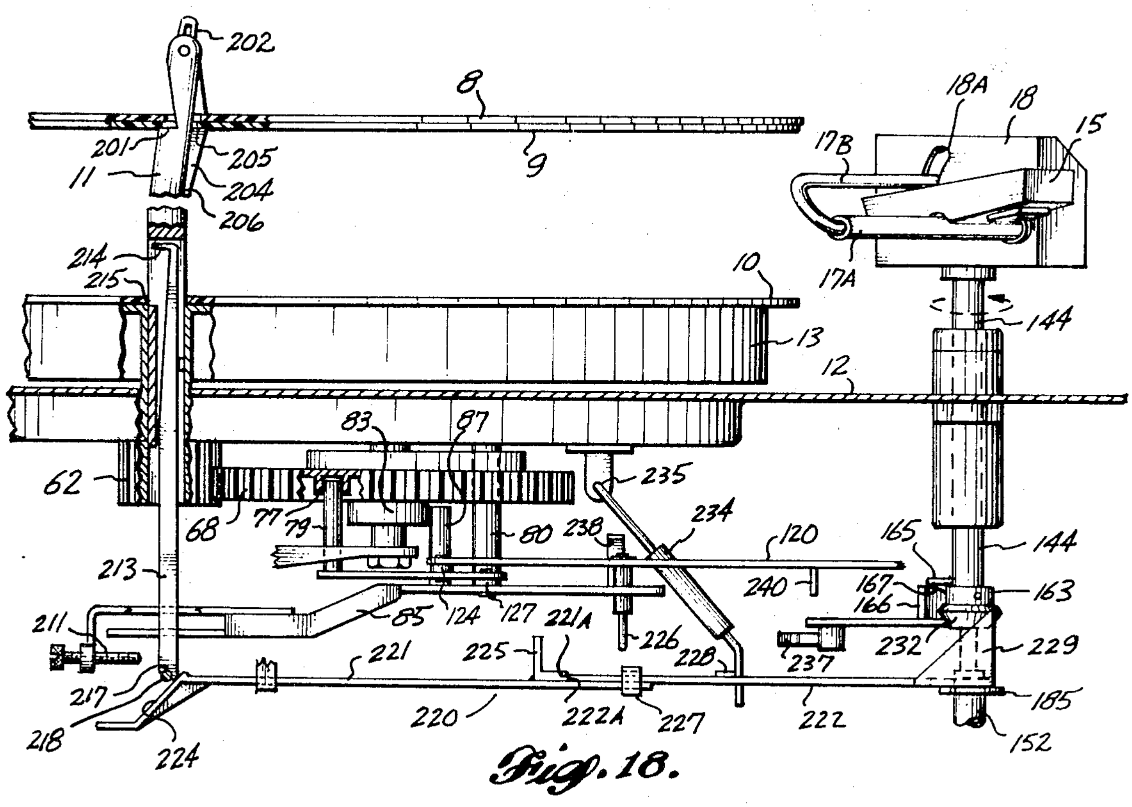

With reference to FIG. 16, it is noted that when such movement of secondary linkage plate 85 occurs and lower end 217 of height rod 213 is pushed from perch 218 by pushrod 211, its vertical fall is resisted by height linkage 220.

As shown, height linkage 220 includes a distal portion 221 and a proximal portion 222 which together telescopically pass through support collar 227 as they extend generally horizontally and radially outwardly from the axis of spindle 11 to the axis of turn shaft 144. The height input cam surface 224 is positioned at the inward end of distal portion 221 to be engaged by lower end 217 of height rod 213. Such engagement causes distal portion 221 to move radially outwardly. This movement is immediately transferred to proximal portion 222 because of the abutment between abutting surface **221*a* of distal member 221 and 222*b* of proximal portion 222**.

Positioned at the extreme outward end of proximal portion 222 is elevation wedge member 229 which slides along secondary support plate extension 185 which is fixed to frame 12. Thus as lower end 217 of height rod 213 falls downwardly from perch support 218, record contact finger 214 engages the upper edges of center record hole 215, as shown in dashed lines in FIG. 16, and thereby gauges the upper most surface of record 10 to be played. This distance is transmitted by lower end 217 engaging height input cam surface 224 causing height linkage 220 to move radially outwardly. This outward movement causes elevation wedge 229 to move on support plate extension 185 until the wedge surfaces 230 thereof have assumed the position for supporting collar height surfaces 232 formed in the lower end of shaft collar 163 so that tone arm 17 is positioned the desired predetermined distance above the surface of the record engaged by contact fingers 214. The predetermined distance is preferably established as that needed to result in the same stylus to record angular relationship that was used to originally cut the record groove. A better view of the engagement between wedge surfaces 230 of elevational wedge 229 and collar height surfaces 232 of shaft collar 163 is seen in FIGS. 4 and 5.

During the time that this height-sensing input and change of position for elevation wedge 229 is taking place, collar elevation arm 165 provides the vertical support for head 18 through turn shaft 144 as it rides along the inclined surface 167 of lift cam 166 which is supported by the frame through support frame member 134.

To restore distal portion 221 back to its initial position as shown in FIG. 3, a repositioning arm 225 extends from distal portion 221 and is engaged by repositioning actuator 226 extending downwardly from primary linkage plate 120.

To reposition proximal portion 222 to its initial position as shown in FIG. 3, a somewhat more elaborate actuation system is required in order that the elevation of tone arm 17 is not changed through the motion of such actuation mechanism. Elevation wedge 229 is to be moved only when it is not supporting any of the weight of shaft collar 163. To accomplish this desired movement a swinging weighted actuator 234 is pivotally supported at 235 to frame 12. To cause counterclockwise movement of actuator 234, a pusher member 238 extends from secondary linkage plate 85 to engage actuator 234 and move it in a counterclockwise direction about pivot 235 as secondary linkage plate 85 moves radially outwardly. At the end of this movement actuator 234 is held in its up position by means of spring bias clip 237. For clockwise movement of actuator 234, release arm 240 extends transversely from primary linkage plate 120. As plate 120 moves inwardly, arm 240 forces actuator 234 to spring out of clip 237 and swing down into contact with realignment arm 228 extending from proximal portion 222. If elevation wedge 229 is supporting the weight of shaft collar 163 through contact with collar height surfaces 232, the weight of actuator 234 will not change this position of elevation wedge 229. At the time, however, that turn shaft 144 is rotated so that collar elevation arm 165 again makes contact with inclined surface 167 of lift cam 166, disengaging the force-transmitting contact between collar height surfaces 232 and wedge surfaces 230 of elevation 229, the weight of actuator 234 is then sufficient to urge the inward radial movement of proximal portion 222 until it again establishes a force-transmitting relationship with distal portion 221 as abutting surfaces **221*a* and 222*a*** come together.

SEQUENCE OF OPERATIONS

To better understand the cooperation between each of the aforementioned systems, attention is now drawn to the figures as a whole for a description of the sequence of operation of improved changer 5. As a beginning point, reference is directed to FIG. 3 wherein tone arm axis 17D is parallel to out-of-play axis 122. Head 15 is in its innermost position adjacent to housing 18 with stylus 16 raised. Turn shaft 144 holds tone arm 17 at its highest position as a result of collar elevation arm 165 being supported at the highest portion of the inclined surface 167 of lift cam 166. Elbow 155 is flexed so that head control rod 147 and secondary tone arm 178 are in their lowermost positions. Cam follower rod 188 is positioned in contact with cam surface 192 of rack support 180 resisting the biasing force of rack spring 183 and thereby establishing a nonengaging clearance between rack end 181 and drive rod pinion 152. The relative positions between upper clutch plate 110, lower clutch plate 115 and catch bell crank 105 are as shown in FIG. 11. Records 8, 9 and 10 are supported on support ledge 201 of spindle 11 with support edge 205 of tongue 204 projecting into center record hole 215 of the lowermost record 10. Height rod 213 is at its resting location with record contact finger 214 held in a nonobstructing position within recess 216 of spindle 11 and lower end 217 supported on perch support 218.

To start, the operator rotates switch 38 to the "start" position pulling a tension on control rod 88 which rotates slotted crank 90 about its pivot 91 permitting control bell crank 96 to pivot about fulcrum 94 with spring 97 causing crank 96 to rotate around pivot 99 so that its working end 98 contacts loop 101 on cycle start rod 73, projecting it inwardly toward center spindle 11. The inward movement of cycle rod 73 rotates detent lever 72 outwardly such that projecting detent 71 is placed in the path of pickup lug 64 of center drive pinion 62.

The initial rotation of start-stop shaft 39 also causes cam 40 to rotate motor switch actuator bell crank 42 depressing motor switch plunger 44 of motor switch 45. The extreme end 43 of bell crank 42 is urged into notch 49 formed in one end of plunger locking cam 47. Detent extension 52 of hidden link 51 is thereby rotated causing the movement of bell crank 105 about pivot 106, through engagement with surface 103, against its biasing spring 107 to a noninterfering position whereby stop element 108 is held out of contact with wing portion 109 of upper clutch plate 110. The depression of motor switch plunger 44 cause electrical connections to be made between power cables 55 and motor control cables 56 so that motor 58 begins the rotation of its drive pinion 59 which is in contact with turntable drive wheel 60 causing the rotation of turntable 13. Since center drive pinion 62 is fixedly secured to turntable 13, the rotation of turntable 13 also causes the rotation of center drive pinion 62. Because of the engagement between pickup lug 64 and projecting detent 71, the continued rotation of center drive pinion 62 causes the engagement of normal teeth 63 of drive pinion 62 and teeth 66 of disc cam wheel 68.

The rotation of disc cam wheel 68 causes primary cam follower 79 to move along primary cam surface 77 forcing primary bell crank 78 to pivot about primary pivot shaft 80. Continued rotation of cam wheel 68 for approximately the first 65° of arc, causes primary linkage plate 120 to move radially outwardly moving with it lower clutch plate 115 in a counterclockwise direction, as seen in FIG. 12. Linkage side arm 121 contacts the lower end of crank arm 36 to move it radially outwardly and with it cycle start rod 73 is moved radially outwardly to withdraw projecting detent and detent lever 72 out of the path of pickup lug 74 of center drive pinion 62.

Continued rotation of cam wheel 68 causes pin 127 of primary bell crank 78 to reach the end of slot 126 in secondary plate 85 thereby urging secondary linkage plate 85 and pusher member 238 secured to the outer end thereof in an outward radial direction. This movement raises swinging weighted actuator 234 in a counterclockwise movement about pivot support 235 until actuator 234 is held in its up position by spring clip 237. Also during this time cam follower rod 188 projects through cutout portion 193 of cam 190 permitting rack spring 183 to force intimate frictional contact between rack end 181 and rod drive pinion 152 causing the clockwise rotation of head control rod 147 and control pulley 170, as seen from above. While such rotation would normally cause the inward movement of head 15 toward housing 18, further movement in this direction is not possible because head 15 is already in contact with housing 18 and therefore cord 30 merely slips relative to lug 15A.

At approximately the 85th degree of arc of rotation of cam wheel 68 from its initial position, secondary linkage plate 85 moves toward its most outward radial position causing the pusher member 238 to complete the positioning of weighted actuator 234 into spring bias clip 237. At the same time, the lower end 207 of spindle tongue member 204 is forced by the radial outward movement of tongue socket 209 to withdraw the upper end and edge 205 of tongue member 204 within the body of spindle 11 permitting record 10 to drop along spindle 11 until it is supported by turntable 13. At approximately the 90° of arc position of disc cam wheel 68, the most outward radial position of secondary linkage plate 85 is reached causing pushrod 211 to push lower end 217 of height rod 213 off of perch support 218 until its downward movement is arrested by the contact of record contact finger 214 with the upper edge of center record hole 215 in record 10. The vertical movement of lower end 217 forces height linkage 220 to move outwardly due to the contact between lower end 217 and height input cam surface 224 and the abutting relationship between surfaces 221*a* and 222*a*. This movement positions elevation wedge 229 under collar height surface 232 at a radial location that will result in tone arm 17 being positioned at a set predetermined vertical position over record 10. It should be noted that during this first 90° of rotation of cam wheel 68, height arm 165 supports the weight of tone arm 17, housing 18, and turn shaft 144 as it engages the highest portion of inclined surface 167 of lift cam 166.

Continued rotation of disc cam wheel 68 to approximately 170° of arc from its initial position causes the end of the outward radial movement of primary linkage plate 120. Just prior to this occurrence, cam follower rod 188 makes contact with plow 194 forcing rack spring 183 to flex disengaging frictional contact between rack end 181 and drive rod pinion 152. Continued rotation of wheel 68 causes primary linkage plate 120 to return on inward radial movement. This movement also begins the clockwise rotation of lower clutch plate 115, upper clutch plate 110, and through contact between collar turn actuator 111 and turn-in arm 168 of shaft collar 163, a similar rotation of tone arm 17 over record 10. Such rotation causes collar elevation arm 165 to move down along inclined surface 167 of lift cam 166 gradually lowering block turn shaft 144 which results in the lowering of housing 18 and tone arm 17.

During the return inward radial movement of primary linkage plate 120, rack support 180 also moves inwardly such that rod 188 is contacted by return path portion 195 of cam 190 whereby there is continued disengagement between drive rod pinion 152 and rack end 181 due to the depression of rack spring 183. This is shown in the lowermost illustration of FIG. 10.

At approximately the 270° of arc position for disc cam wheel 68, tongue 204 attempts to move to an extreme position relative to spindle 11 but further movement is resisted by the edge of the center hole of record 9. If further movement had been permitted due to the absence of additional records on the stack, this movement would be sensed by hidden link 51 changing the position of its cam surface 103 thereby permitting catch bell crank 105 to rotate stop element 108 into the path of wing portion 109 of upper clutch plate 110 to prohibit further inward movement of the tone arm 17 after the playing cycle so that the last record will not be played more than once automatically.

At approximately the 330th degree of arc of rotation for disc cam wheel 68, collar elevation arm 165 is no longer supported by incline surface 167 of lift cam 166. Rather, turn shaft 144 becomes supported by contact between wedge surfaces 230 of elevation wedge 229 and the collar height surfaces 232, such as shown in FIGS. 4 and 5. Continued rotation of disc cam wheel 68 causes release arm 240 on primary linkage plate 120 to force swinging weighted actuator 234 out of spring clip 237 until it swings down and makes contact with realignment arm 228 extending from proximal portion 221 of height linkage 220. As noted before, the weight of actuator 234 is not sufficient to cause movement of elevation wedge 229 while it is supporting block turn shaft 144, housing 18 and tone arm 17.

At approximately the 335th degree of arc of rotation for disc cam wheel 68, cam follower rod 188 is engaged by second plow 196 of cam 190 thereby urging the rack end 181 of rack support 180 to move upwardly. At about this same time repositioning actuator 226 extending downwardly, from primary linkage plate 120 makes contact with and urges inwardly radial movement of repositioning arm 225 and through it, distal portion 221 of height linkage 220. With this inward radial movement, height input cam surface 224 wedges the lower end 217 of height rod 213 upwardly until at the end of the cycle lower end 217 is supported on perch support 218 with record contact finger 214 disposed in its uppermost flush position within recess 216 of spindle 11. This action is completed at approximately the 355th degree of arc for disc cam 68.

At approximately this same position, upper wing 138 of elbow actuator 132 is engaged by detent 129 of primary linkage plate 120 forcing elbow actuator 132 to move in a clockwise direction as seen in FIG. 6. This movement causes actuator wing 141 to engage hinge joint 156 of elbow 155 tending to straighten elbow 155 out with upper leg 157 forced against the head control rod 147 at the upper end of reduced neck portion 150. This upward movement of head control rod 147 causes pulley yoke 171 to rotate control pulley 170 and secondary tone arm leg 17B about primary tone arm leg 17A in an upward direction along slot 18A of housing 18. Such rotation frees the engagement between lug 15A and drive cord 30 and permits head 15 to rotate on roller 22 about tone arm 17A until stylus 16 makes contact with the groove of record 10.

The engagement of stylus 16 into contact with beginning of the groove of record 10 is completed at the time that disc cam 68 completes its first 360° of rotation. At this point, stylus 16 begins to follow the path of playing axis 20. Since the electrical lead cables 25 are of very light weight and there are bearing-supported tapered rollers 22 used to provide a virtually frictionless movement of head 15 along primary leg 17A of tone arm 17, there is virtually no drag caused by the tracking of stylus 16 within the groove of record 10 as it proceeds along the record playing radius 20.

If during the course of play the operator decides to reject the record, he merely cycles the switch 38 the same way that he did to initially begin operation of the record player and this causes tone arm 17 to move in a counterclockwise direction, as will be described in more detail with reference to the normal operation of the tone arm which is caused by the sensing of the end of the record.

As head 15 proceeds along primary tone arm 17A toward the end of the groove in record 10, head 15 engages distal end 28 causing trip rod 27 to move with the head 15 as it proceeds to the end of the groove of the record 10. The proximal end 29 is also caused to move and its movement is transferred to beneath housing 12 by contact with trip feeler lever 34, which extends through housing 12 terminating at crank arm 36. This movement produces inward radial movement of rod 73 which rotates detent lever 72 outwardly until projecting detent 71 connected thereto is placed in the path of pickup lug 64 on center drive pinion 62. Continued rotation of turntable 13 causes engagement between normal teeth 63 of drive pinion 62 and teeth 66 of disc cam wheel 68. During the first few degrees of arc of movement of disc cam wheel 68, there is no connection between drive pin connection 117 at the end of primary linkage plate 120 and collar turn-out surface 169. Therefore, block turn shaft 144 is not rotated; however, lower clutch plate 115 begins its counterclockwise rotation during this time. Also during this period elbow actuator 132 is permitted to rotate about pivot pin 133 due to the disengagement between upper wing 138 and detent 129. As seen in dotted lines in FIG. 6, this disengagement between detent 129 on primary linkage plate 120 and wing 138 permits elbow 155 to partially collapse under the urging of elbow spring 160 thereby lowering head control rod 147. The lowering of rod 147 causes pulley yoke 171 to rotate downwardly about primary tone arm leg 17A and with it, secondary tone arm 17B moves along slot 18A until drive cord 30 engages lug 15A of pickup head 15. With about fifteen degrees of rotation of wheel 68, cam follower rod 188 is positioned opposite cutout portion 193 of cam 190 thereby permitting rack spring 183 to force rack end 181 into engagement with rod drive pinion 152. At approximately this same point in time, pin connection 117 makes contact with collar turn-out surface 169 thereby urging the counterrotation of turn shaft 144 and tone arm 17.

As wheel 68 rotates to the 55° to the 85° of arc position, head control rod 147 is rotated, thereby rotating pulley shaft 175 and control pulley 170. Such rotation causes cord 30 to move inwardly along secondary tone arm leg 17B bringing with it head 15 which is reeled in toward housing 18. During the reeling-in operation lightweight electrical lead 25 is looped out of the way.

As tone arm 17 is rotated away from the playing position, the collar elevation arm 165 again engages inclined surface 167 of lift cam 166, taking the load off of elevation wedge 229. Once this weight is released from wedge 229, swinging weighted actuator 234 urges the inward movement of proximal portion 222 until abutting contact is restored between surfaces **221*a* and 222*b* of height linkage 220**.

From this point on the cycle is repeated until there are no further records to be dropped onto the turntable. After the play of the last record on the turntable, tone arm 17 is moved to its out-of-play position and everything is restored to initial position as described with reference to FIG. 3.

What is claimed is:

1. In a phonograph, the improvement comprising in combination: rotatable support means for grooved records; linkage means; electrically driven motion-producing means for providing a predetermined movement of said linkage means; a tone arm assembly including a pickup head means having a stylus extending therefrom for contacting the grooved area of said record, leg means extendable over said rotatable support means for supporting said head for movement therealong, a yoke member supporting one end of said leg means and pivotably rotatable for rotating a portion of said leg means about the balance of said leg means with engagement means on said pickup head being selectively positioned in contact with said portion of said leg means for rotating said head about said leg means from a lowered position with said stylus in contact with said record to a raised position with said stylus lifted away from said record; rod means extending normal to said rotatable support means and connected to said yoke means; and means for vertically moving said rod means responsive to and operatively connected with said linkage means to selectively pivot said yoke means for automatically changing the contact relationship between said stylus and said record as a result of movement of said linkage means.

2. The phonograph of claim 1 wherein said vertically moving means includes:

a hinged elbow member having one end engaging a portion of said rod means, a pivotally supported elbow actuator member having means engageable by said linkage means and other means positionable to engage the hinge portion of said elbow member for extending the length of said elbow member responsive to engagement between said actuator member and said linkage means for raising said rod means and thereby lowering said stylus into contact with said grooved record.

3. The phonograph of claim 2 wherein said elbow member is spring biased toward a collapsed position resulting in the lowering of said rod means and the raising of said stylus up from said record when said actuator member is not engaged by said linkage means.

4. The phonograph of claim 2 including:
a support housing for supporting one end of said leg means;
a turn shaft secured at one end to said support housing and pivotally mounted for turning said support housing and said tone arm assembly from a play position over said record to an out-of-play position off to the side of said record;
said rod means being coaxially supported within a hollow portion of said turn shaft and vertically movable relative to said turn shaft; and
said turn shaft providing an elongated slot through which a portion of said elbow member projects for engaging said rod means with the other portion of said elbow member pivotally supported by and movable with said turn shaft.

5. In a phonograph, an improved tone arm assembly comprising:
a tone arm housing;
leg means extending outwardly from said housing;
a pickup head supported on said leg means for relative translational movement with respect thereto;
head-moving means including an elongated flexible member movable along said leg means and selectively engageable with said head to move said head to a selected position along said leg means;
motion producing means including drive motor means for producing a rotary motion;
drive pulley means supported within said housing and engageable with said flexible member for moving said flexible member as said pulley means is rotated;
drive rod means connected at one end to said pulley and including a pinion member positioned at the other end thereof;
said motion-producing means being selectively engageable with said pinion member for rotating said pinion member and thereby rotating said pulley and moving said flexible member.

6. The phonograph of claim 5 including means for vertically moving said rod means and rotating said pulley and leg means thereby establishing contact between said flexible member and said pickup head when said rod means is in its lowered position and disengaging contact between said flexible member and said head means when said rod means is in its raised position.

7. The phonograph of claim 6 wherein:
said rotary motion-producing means includes a cam portion permitting selective engagement of said rotary motion-producing means and said rod pinion only during that portion of the cycle when said rod is in its lowermost position.

8. The phonograph of claim 6 wherein:
the connection between the upper end of said rod and said pulley is provided by a flexible connector means.

9. In a phonograph the improvement comprising: a rotatable support for a grooved record; a tone arm supported on a vertically extending turn shaft for pivotable movement of said tone arm about a vertical axis extending normal to the plane of said record in a first direction positioning said tone arm over said record and in a second direction, opposite to said first direction, positioning said tone arm in an out-of-play position off to the side of said record; said turn shaft including an elevation surface and an elevating member extending radially outwardly from said shaft; means for turning said turn shaft in said first and second directions; elevation cam means positioned adjacent to said turn shaft and including a surface along which said elevating member rides for lifting said turn shaft and tone arm to their highest position relative to said rotatable support as said turn shaft reaches the end of its movement in said second direction and for lowering said turn shaft and tone arm relative to said rotatable support as said tone arm reaches the end of its movement in said first direction; height sensing means for sensing the height of the highest record supported by said rotatable support; wedge means for varying the vertical position of said shaft elevation surface operatively connected to said height-sensing means for vertically positioning said tone arm over said highest record at a predetermined distance when said tone arm reaches the end of its movement in said first direction.

10. The phonograph of claim 9 wherein said wedge means is changed in its position responsive to the height sensed by said height-sensing means during that portion of the cycle that there is no engagement between said elevating surface and said wedge means.

11. The phonograph of claim 9 wherein said height-sensing means includes a feeler rod having one end selectively positioned for engaging the upper edge of said highest record; a perch support means for vertically supporting said feeler rod in a raised nonobstructing position; height linkage means extending from an initial position, beneath said perch support means in the path of said feeler rod when it is pushed from said perch support means to said wedge means; motion-producing means; pusher means supported by said motion-producing means and positioned for contacting the lower end of said feeler rod for pushing said feeler rod off of said perch support means when said tone arm is at the end of its movement in the second direction thereby permitting said feeler rod to engage the edge of the highest record supported on said rotatable support; and said height linkage means having an inclined cam surface positioned in the path of the lower end of said feeler rod beneath said perch support means for engaging said lower end and pushing said linkage and wedge means to a position beneath said shaft elevation surface for establishing a predetermined clearance desired between the surface of the record sensed by said feeler and said tone arm when said wedge means engages and thereby supports said shaft elevation surface.

12. The phonograph of claim 11 wherein: said height linkage means having two overlapping linkage members providing an abutting relationship for outward radial movement resulting from contact between said feeler rod and the cam surface of said height linkage means but permitting relative sliding between said linkage members for independent inward radial movement; repositioning means disposed on said motion-producing means for engaging the cam surface of said height linkage and moving it radially inwardly to cam said feeler rod upwardly onto its position on said perch support means as said height linkage cam surface is pushed by said repositioning means.

13. The phonograph of claim 12 including: a weighted swinging arm member selectively engageable with one of the members of said height linkage for moving it radially inwardly for establishing an abutting relationship with said other height linkage member when the weight of said turn shaft is removed from said wedge means as said elevating member engages said elevation cam means.

14. In a phonograph, an improvement comprising in combination: rotatable support means for a grooved record; motion-producing means for rotating said record support and for selectively moving linkage members in a radial direction inwardly toward the center of said record support and outwardly away from said center; tone arm means; a support housing connected to said arm means; a vertically extending turn shaft connected to said housing and adapted for rotation for selectively turning said tone arm means in a first direction to a play position over said record and in a second direction, opposite to said first direction, to an out-of-play position off to the side of said record; a sound pickup head and stylus assembly supported by said arm means and adapted to transit along said tone arm means, with said stylus tracking in the groove of said record toward the center thereof along a path coincident with a radius of said record when said tone arm means is in said play position; a flexible endless drive member extending through said housing and tone arm means for selectively engaging and moving said head assembly along said tone arm means toward said housing; pulley means supported within said housing and frictionally engaging said flexible drive member; drive rod means extending coaxially within said turn shaft and having one end operatively connected to said pulley means and a pinion portion thereof operatively connected to one of said movable linkage members for rotating said rod means and thereby rotating said pulley means and driving said flexible drive member.

15. The phonograph of claim 14 wherein: said tone arm means includes two leg means extending outwardly from said housing; said pulley means and tone arm means are connected by a yoke member permitting the downward tilting of said pulley about one of said tone arm legs until the other of said tone arm legs engages said pickup head for moving said stylus up from said record and establishing a driving relationship between said flexible drive member and said head; said drive rod means being vertically movable relative to said turn shaft for downwardly tilting said pulley before said turn shaft is operated by said motion-producing means to turn said tone arm means in either said first or second direction.

16. A phonograph record player comprising in combination: rotatable record support means; first drive means coupled with said support means; an elongated tone arm; tone arm support means connected to said tone arm and pivotably supported adjacent the edge of said record support means and having a first position wherein the arm extends across said record support means and a second position wherein said tone arm is not disposed above said record support means, said arm remaining in said first position during the playing of a record; pickup head means supported on said arm and movable therealong, said head means having a stylus therein for engaging a record; first head control means movable between a first position of holding said stylus away from engagement with a record and a second position of permitting engagement of said stylus with a record; second head control means selectively engageable with said head means and operable to move said head means along said tone arm means; electrically driven power drive means coupled with said tone arm support means and with said first and second head control means and cooperating therewith to define and cause a first cycle of operation wherein said arm support means first moves from its second to its first position with said first head control means held in its said first position during said movement, and then said first head control means is moved to its second position; and a first cycle control means located along said arm and operable by said head means as said head means transits along said arm, said first cycle control means being operative to initiate a second cycle of operation.

17. The apparatus of claim 16 wherein said electrically driven power drive means further includes means defining and causing said second cycle of operation wherein said first head control means is first moved from its second to its first position and then said arm support means and said second head control means are operated to move said arm to its second position and to move said head means along said arm toward said arm support means.

18. The apparatus of claim 16 including arm support control means connected to said arm support means for elevating and lowering said arm support means relative to said record support means, and record sensing means coupled with said arm support control means for sensing the number of records on said record support means to control the elevation of said arm support means.

19. The apparatus of claim 16 wherein said arm support means is movable in a direction perpendicular to said record support means, and further including spindle means extending upwardly from said record support means and having an elongated opening therein; record height sensing means including an elongated sensing member located inside said spindle with a portion thereof selectively movable through said opening for sensing the number of records on said record support means; and tone arm elevation control means coupled with said height sensing means and with said arm support means.

20. The apparatus of claim 19 wherein said elevation control means includes means operable to move said arm support means to its position of maximum elevation and then lower said arm support means to an elevation which is controlled by said sensing member.

21. The apparatus of claim 16 wherein said arm means includes an elongated hollow rod and said second head control means includes an elongated flexible member.

22. The apparatus of claim 21 wherein said flexible member is disposed inside an elongated rod having a slot therein and said head means has a portion adapted to pass through said slot for engagement with said flexible member.

References Cited

UNITED STATES PATENTS

| | | | |
|---|---|---|---|
| 2,566,091 | 8/1951 | Masterson | 274—23 (X) |
| 2,947,542 | 8/1960 | Grunwald | 274—10 |
| 3,017,187 | 1/1962 | Ryan | 274—14 |
| 3,042,410 | 7/1962 | Brandizzi | 274—10 |
| 3,044,782 | 7/1962 | Hansen. | |

LEONARD FORMAN, Primary Examiner

S. STEPHAN, Assistant Examiner

U.S. Cl. X.R.

274—15 R, 23 A